(12) United States Patent
Shi et al.

(45) Date of Patent: Feb. 19, 2002
(10) Patent No.: US 6,349,120 B1

(54) METHOD FOR IMPROVING SPECTRAL SAMPLING USING SUB-BURST DISCREET FOURIER TRANSFORMS

(75) Inventors: Zhen-Liang Shi, Germantown; Yezdi Antia, Gaithersburg; A. Roger Hammons, Jr., North Potomac, all of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/205,592

(22) Filed: Dec. 4, 1998

Related U.S. Application Data

(60) Provisional application No. 60/098,674, filed on Sep. 1, 1998.

(51) Int. Cl.[7] .............................................. H04L 27/06
(52) U.S. Cl. ........................................ 375/316; 375/340
(58) Field of Search .......................... 375/260, 316, 375/365, 366, 267, 347, 340; 370/514, 509, 503; 455/132–135

(56) References Cited

U.S. PATENT DOCUMENTS

| | | | |
|---|---|---|---|
| 5,696,762 A | * 12/1997 | Natali et al. ............... | 370/342 |
| 5,838,799 A | * 11/1998 | Cioffi et al. ................ | 375/260 |
| 5,914,933 A | * 6/1999 | Cimini et al. ............... | 375/347 |
| 6,072,769 A | * 6/2000 | Ho ............................ | 370/525 |

OTHER PUBLICATIONS

ZHeng–Liang Shi et al., "A Sub–Burst DFT Scheme for CW Burst Detection in Mobile Satellite Comm.,"IEEE Journal on Selected Areas in Comm., vol. 18, No. 3, Mar. 2000.*

* cited by examiner

*Primary Examiner*—Tesfaldet Bocure
(74) *Attorney, Agent, or Firm*—John T. Whelan; Michael W. Sales

(57) ABSTRACT

A method for improving spectral sampling using Discrete Fourier Transforms in a processor to detect a continuous wave (CW) signal in a burst having large initial uncertainties comprises the steps of dividing the burst into smaller sub-bursts; performing a Discrete Fourier Transform on each sub-burst; and non-coherently combining each sub-burst. A further variation includes selecting an optimal number L of sub-bursts based upon system performance, and desired detection performance at a minimum operating signal to noise ratio.

7 Claims, 4 Drawing Sheets

BLOCK DIAGRAM OF THE CW
DETECTOR USING DFT (PRIOR ART)

FIG. 3 PROBABILITIES OF FALSE DETECTION AND MISS DETECTION FOR THE BEST CASE, I.E. $\Delta fT=0, N=120, E_i/N_0=2.5dB$ FIG. 4 PROBABILITIES OF FALSE DETECTION AND MISS DETECTION FOR THE WORST CASE, I.E. $\Delta fT=1/(2N), N=120, E_i/N_0=2.5 dB$ ME THOD FOR IMPROVING SPECTRAL SAMPLING USING SUB-BURST DISCREET FOURIER TRANSFORMS

BACKGROUND OF THE INVENTION

This application claims priority to U.S. Provisional patent application Ser. No. 60/098,674, of Shi, et al.; filed Sep. 1, 1998, for SUB-BURST DISCRETE FOURIER TRANSFORM FOR ROBUST CONTINUOUS WAVE BURST DETECTION, incorporated herein by reference.

The present invention relates to methods of spectral sampling in communication systems using Discrete Fourier Transforms. More particularly, it relates to spectral sampling where there are large propagation delays or large frequency or time uncertainties for detection. Even more particularly, the present invention relates to spectral sampling of a continuous wave burst from a mobile satellite station during synchronization.

In mobile satellite communications, mobile satellite stations, satellites and gateway stations must be synchronized in order to diminish the effects of large propagation delays from the satellite due to the large distances from each satellite station to a base station. The propagation and other delays cause large frequency and time uncertainty at the base station. Typically, synchronization is achieved during a call set up, wherein a user terminal sends a random access burst (RAB) to the base station. A continuously wave (CW) signal is part of a random access burst (RAB) and is used to resolve initial large frequency and time uncertainty at the base station. The RAB is random and the acquisition of the RAB is based on the detection of the CW burst.

A conventional way to detect the CW burst, is to perform a Discrete Fourier Transform (DFT) on the random access burst. Discrete Fourier Transforms are well studied and relatively easy to implement for the skilled artisan.

Additionally, some unique words (UW), or packet identification bit sequences, are used in the random access burst (RAB) to resolve the large time uncertainty. In this way, the satellite can use a DFT algorithm for CW signal detection in the random access burst and, after achieving frequency estimation, further achieve time estimation based upon correlation of the unique words from the random access burst, as received by the satellite, with a reference random access burst.

However, conventional use of a Discrete Fourier Transform (DFT) scheme for a continuous wave burst detection suffers a spectral sampling effect. Conventionally the Discrete Fourier Transform scheme involves performing a finite number of band-pass filter calculations, or bin calculations, with filter calculations defined according to uncertainty in the frequency. The Discrete Fourier Transform starts to search around a nominal frequency (plus or minus some error ellipse) of the communication system, which can be C-band, K-band, L-band, or any other frequency band.

In the case of the CW signal, the frequency is unknown at the receiver, and thus the Discrete Fourier Transform spectral lines (which are a function of the sampling frequency, and not the frequency of the CW signal) do not necessarily coincide with the frequency of received CW signal. Thus, the Discrete Fourier Transform output cannot truly represent a real signal spectrum of the CW signal, thus causing defective detection performance to vary with frequency of the CW signal. Thus, the detection performance will vary according to the CW signal frequency, and, unless the CW frequency exactly equals one of the Discrete Fourier Transform's bin frequencies, will be degraded according to how far the CW signal's frequency varies from bin frequency of the Discrete Fourier Transform.

Conventionally, a communication receiver or the satellite will coherently combine all the digital samples from the CW signal. This requires the communication receiver to track the signal phase, requiring a more complicated receiver in general. This conventional method achieves the highest theoretical performance in the case where the frequencies of the CW signal are always aligned with one of the DFT bin frequencies. When the frequency of the CW signal is not always aligned with zone of the Discrete Fourier Transforms bin frequencies, overall performance suffers, unless complicated and expensive circuitry is involved in achieving such performance using coherent signal combination.

As shown in a block diagram in FIG. 2, in a conventional CW detector using a Discrete Fourier Transform, a first stage shifts an RF frequency at 212 down to an intermediate frequency, or IF frequency at 214. Next, after sampling the analog signals of in-phase (I) and quadrature phase (Q) components, two identical digital-low pass filters 220, 221 smooth the I and Q components samples. Next, filtered I and Q samples are first decimated and then fed into the Discrete Fourier Transform processor. The Discrete Fourier Transform processor 222 computes the signal power of those bin frequencies covering an initial frequency uncertainty, and a maximum power is chosen from amongst the bin frequencies by a maximum power selector 224. The chosen maximum power is compared with a pre-set threshold by a comparator 226 to determine if a continuous wave burst has arrived.

Since many frequency bins must be computed, it can become increasingly time consuming to perform the Discrete Fourier Transform computation for a random access burst with very large frequency and time uncertainty. The number of frequency bins is therefore kept to a minimum by increasing the size (i.e., filter bandwidth) of each bin. Once a preliminary detection is achieved, a finer frequency estimation and time estimation is performed using narrower filtering bins.

Prior methods to combat the effect of spectral sampling have included: 1) zero-padding plus interpolation, and 2) windowing the received CW signal samples.

Each of the two known prior methods of zero-padding and windowing are computationally intensive and while improving the overall performance of the conventional Discrete Fourier Transform algorithm increases the performance time and complexity of the receiver within the satellite.

The known method of zero-padding for CW signal detection requires more frequency bins with the same frequency uncertainty. Thus, the method of zero-padding is not acceptable for modern mobile satellite communication systems.

The prior method of windowing weights the samples for a non-linear window and consequently reduces side lobe effects of the signal. This requires a large amount of computation because a window weighting must be redone upon each new burst. Thus, the method of windowing is not acceptable for modern mobile satellite communication systems.

There is therefore a need in the field of mobile satellite communications for an improved method of continuous wave detection (cw detection) using a Discrete Fourier Transform processor which does not degrade performance or increase complexity of computations.

The present invention advantageously addresses the above and other needs.

SUMMARY OF THE INVENTION

The present invention advantageously addresses the needs above as well as other needs by providing a method for improving spectral sampling in continuous wave burst detection by using a non-coherent combination of sub-burst Discrete Fourier Transforms in a processor.

The advantage of using sub-bursts to more closely align a signal frequency to a bin frequency out weighs the theoretical degradation of using non-coherent combining of the sub-bursts instead of coherent combining. The optimum sub-bursts are determined with this invention.

The present approach involves, in one embodiment, the steps of: dividing the digital samples of a continuous wave burst into smaller sub-bursts, each having a smaller number of samples M than the total number of samples N in the continuous wave burst; performing a Discrete Fourier Transform on each sub-burst to produce associated sub-burst Transform data; and non-coherently combining the associated sub-burst Transform data for each sub-burst to produce a non-coherent digital signal.

In another embodiment, the invention can be characterized as a method for improving spectral sampling in a communication system using a Discrete Fourier Transform processor to detect a continuous wave signal of large uncertainty, further comprising steps of: receiving a continuous wave burst comprising a signal; digitizing the signal into N samples; selecting an optimal number L of sub-bursts based upon system performance including data rate, and simulated spectral and time uncertainty of the continuous wave burst; and determining synchronicity and spectral content of the continuous wave burst based upon the Transform sub-burst data.

In a variation, the invention further comprises steps of selecting a maximum experimental number of sub-bursts, said optimal number L being not greater than the maximum experimental number; determining a false detection probability function at each of a plurality of candidate numbers not greater than the maximum experimental number; determining a miss detection probability function at each of the plurality of candidate numbers; simulating false detection and miss detection probability data for each of the plurality of candidate numbers for a best case and a worst case, according to respective ones of the determined probability functions, wherein the best case corresponds to a detection at a center of a frequency bin of the Discrete Fourier Transform and the worst case corresponds to a detection at adjacent edges of two frequency bins in the Discrete Fourier Transform; and comparing the false detection and miss detection probability data for each of the plurality of candidate numbers to determine an optimal number L of sub-bursts.

BRIEF DESCRIPTION OF THE DRAWINGS

The above and other aspects, features, or advantages of the present invention will be more apparent from the following more particular description thereof presented in conjunction with the following drawings wherein.

DETAILED DESCRIPTION OF THE PREFERRED EMBODIMENTS

The following description of the presently contemplated best mode of practicing the invention is not to be taken in a limiting sense but is made merely for the purpose of describing a general principle of the invention. The scope of the invention should be determined with reference to the claim.

Figure 1:
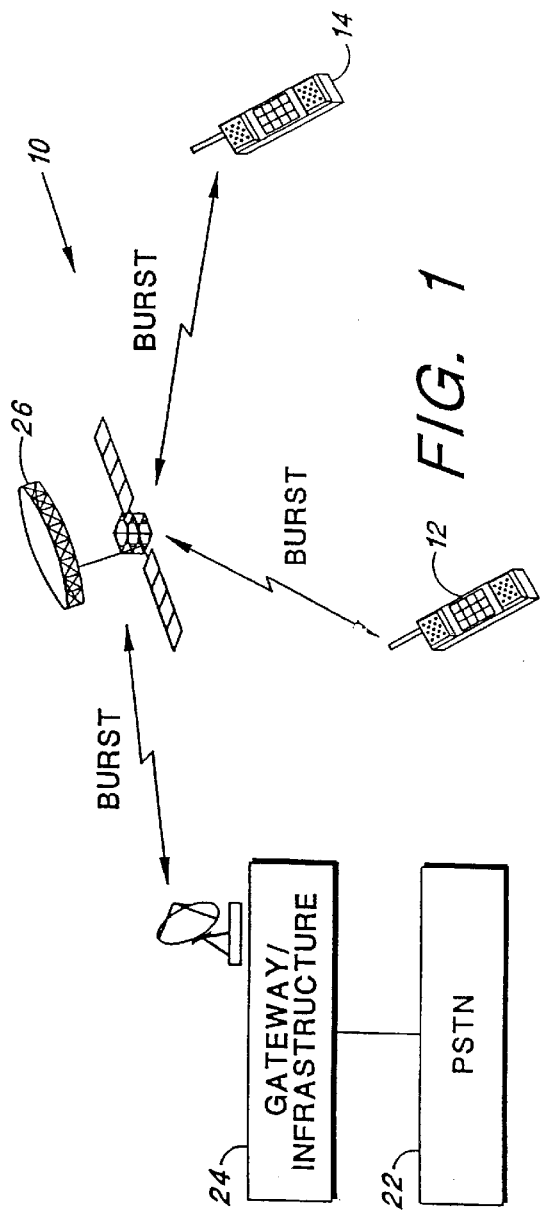
FIG. 1 is a block diagram of a satellite system infrastructure in which the present invention may be used.

Referring first to FIG. 1, a block diagram of a multiply registered wireless transceiver (or terminal 12); a second multiply registered wireless transceiver (or terminal 14); a public switched telephone network (PSTN) 22; a satellite gateway/infrastructure 24 (or gateway/network); and a satellite link 26; the block diagram is an example of a satellite system infrastructure 10 in which the method for improved spectral sampling may be used.

When a call is initiated through the public switched telephone network 22 to one of the wireless transceivers 12, 14 and the number called through the public switched telephone network 22 is identified as for a satellite system 10, the call is routed by the public switched telephone network 22 to the gateway (infrastructure 24) that transmits a page message ("Burst") to the satellite link 26 with which the wireless transceiver 12 is registered. The wireless transceiver 12 is assigned a paging channel by the satellite system 10. The wireless transceiver 12 monitors the paging channel assigned to it by the satellite system 10.

Figure 2:
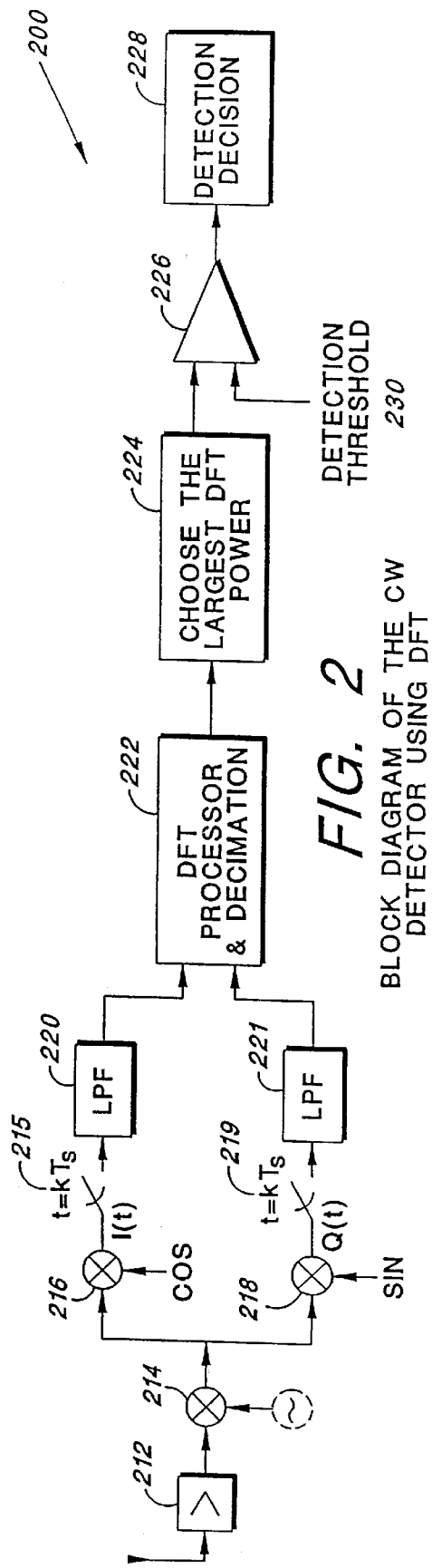
FIG. 2 is a block diagram of a continuous wave detector using a Discrete Fourier Transform in accordance with the prior art, that is modifiable using the teachings of the present invention to use an optimum amount L of N-point Discrete Fourier Transforms.

When a continuous wave burst ("Burst") containing the RAB message is sent from wireless terminal 12, 14 to satellite 26, satellite 26 relays the Burst to gateway 24, for synchronization involving the DFT processing by a detector 200 as shown in FIG. 2.

FIG. 2 is a block diagram for the prior art approach of detecting a continuous wave signal at a detector 12 using a Discrete Fourier Transform processor 222. In accordance with the teachings of the present embodiment, the processor 222 is modified to perform an optimum amount L of N-point Discrete Fourier Transforms.

A two-stage down conversion process is shown in which the first stage 214 shifts an RF frequency of an incoming signal (by mixing the incoming signal with a reference signal) to an intermediate frequency.

The intermediate frequency signal is then further down converted at 216, and 218, (by mixing with in-phase and quadrature phase reference signals) to in-phase (I) and quadrature phase (Q) components. The in-phase and quadrature phase components are then sampled by respective analog to digital converter 215, 219.

Second stage digital low-pass filters 220, 221 (one for the in-phase samples and one for the quadrature phase samples) remove high frequency aliases from the respective components. The filtered I and Q samples from 220 are first decimated to a lower sample rate and then fed into the Discrete Fourier Transform processor 222 to compute DFT powers of the frequency bins covering frequency uncertainty in the continuous wave signal in the burst.

A maximum Discrete Fourier Transform frequency bin power is chosen at 224 to compare at a comparator 226 with a pre-set threshold 230 to determine 228 if a continuous waves signal has arrived in the incoming signal. A Discrete Fourier Transformer bin size is, in accordance with prior art approaches, usually tailored to meet the system timing requirements. Fine-tuning of frequency estimation, in some approaches, may be done with finer bandwidth frequency bins.

A received baseband signal may be represented in complex form by $$r_i = s_i + n_i, \; i = 0, 1, 2, \ldots, N; \quad (1)$$

where $S_i$ denotes the N samples of the CW signal given by:

$$s_i = A \exp\{j(2\Pi f_d T i + \phi)\}; \quad (2)$$

wherein N is the number of samples of the continuous wave burst; T is the decimated sampling interval; $f_d$ is the frequency of the CW signal, $\phi$ is a random phase in $[0, 2\Pi]$ and A is the amplitude of the complex signal. Noise samples are represented as $$n_i = n_i^I + jn_i^Q; \quad (3)$$

where $n_i^I$ and $n_i^Q$ are Gaussian variables of zero mean and with variance $\sigma^2 = \text{var}\{n_i\} = \text{var}\{n_i^I\} = \text{var}\{n_i^Q\} = N_o B$ wherein B represents the bandwidth of a detection filter of the Discrete Fourier Transform processor and $N_o$ represents the noise density. It is well know that $n_i^I$ and $n_i^Q$ are independent if B=1/T.

In the conventional method of coherently combining an N-point DFT with the N-element vector $[r_o, r_1, r_2, \ldots r_{N-1}]$, wherein N is the number of samples in the burst, the Discrete Fourier Transform detection algorithm of Equation (4) would be used, where m represents the bin closest to the normalized CW frequency $f_d T$ $$Y = \sum_{i=0}^{N-1} r_i e^{-j\frac{2\pi mi}{N}} \quad (4)$$

A new N-point DFT method and processor is used in the present embodiment by performing a optimum amount L of smaller Discrete Fourier Transform's, each Discrete Fourier Transform covering M signal samples in the preferred case that N=LM. The new N-point Discrete Fourier Transform can be expressed as $$Y = \sum_{k=1}^{L} Y_k; \quad (5)$$

wherein $$Y_k = \sum_{i=(K-1)M}^{kM-1} r_i e^{-j\frac{2\pi mi}{n}}.$$

Y of Equation (4) and (5) and $Y_k$ of Equation (6) represents the signal amplitude for the burst and sub-bursts k=1 to L, respectively. The corresponding power of the signal represented by $Y_k$ is represented by $$F = \sum_{k=1}^{L} |Y_k|^2 \quad (7)$$

Equation (7) is a "test variable" that is compared to a power threshold shown as the detection threshold used by the comparator 26 of FIG. 1.

The algorithm of Equation (4) and (5) represents the case when L is set to 1, i.e., when there are no sub-bursts, which is in accordance with prior art teachings.

In selecting an optimal number of sub-bursts L the probability of a false detection and a miss detection are analyzed for all possible L's considered for a given number of Burst samples and a given signal to noise ratio of a detection.

$Y_k$ can also be represented in exponential form by separating its signal and noise components using both Equations (1) and (6).

$$Y_k = \sum_{i=(k-1)M}^{kM-1} s_i e^{-j\frac{2\pi mi}{n}} + \sum_{i=(k-1)M}^{kM-1} n_i e^{-j\frac{2\pi mi}{n}} \quad (8)$$

$$Y_k = S_k + N_k,$$

or, wherein $N_k$ is also represented by its in phase and quadrature components, $$N_k = N_k^I + jN_k^Q, \quad (9)$$

and wherein the in-phase component is $N_k^I$;

$$N_k^I = \sum_{i=(k-1)M}^{kM-1} \left[n_i^I \cos(2\pi mi/N) + n_i^Q \sin(2\pi mi/N)\right], \quad (10)$$

and wherein the quadrature component is $N_K^Q$ $$N_k^Q = \sum_{i=(k-1)}^{kM-1} \left[n_i^Q \cos(2\pi mi/N) - n_i^I \sin(2\pi mi/N)\right]. \quad (11)$$

$N_k^I$ and $N_k^Q$ for all K are mutually independent Gaussian variables having zero mean and variance $$\sigma_1^2 = M\sigma^2$$

The signal component $S_k$ can similarly be represented by its in-phase (I) and quadrature (Q) components and by applying Equation (2). $S_k$ can be written in exponential form as $$S_k = A e^{j\varphi} \sum_{i=(k-1)M}^{kM-1} e^{j2\pi(f_d - \frac{m}{N}f)Ti} \quad (12)$$

$$= A e^{j\varphi} \sum_{i=(k-1)M}^{kM-1} e^{j2\pi \Delta fTi}$$

$$= A e^{j[\pi \Delta fT(2kM-M-1)+\varphi]} \frac{\sin(\pi \Delta fTM)}{\sin(\pi \Delta fT)}$$

wherein the sampling frequency f=1/T and where $$\Delta f = (f_d - m/Nf).$$

$$\rho(\Delta f) = \frac{\sin(\pi \Delta fTM)}{\sin(\pi \Delta fT)}, \quad (13)$$

results in Equation (14) and Equation (15) as follows.

$$S_k^I = A \cos[\Pi fT(2kM-M-1)+\phi]\rho(\Delta f) \quad (14)$$

$$S_k^Q = A \sin[\Pi \Delta fT(2kM-M-1)+\phi]\rho(\Delta f) \quad (15)$$

Thus, $Y_k$ can also be written as $$Y_k = (S_k^I + N_k^I) + j(S_k^Q + N_k^Q) \tag{16}$$

From Equation (7) and Equation (16) the test variable F can be written as $$F = \sum_{k=1}^{L} \left[ (S_k^I + N_k^I)^2 + (S_k^Q + N_k^Q)^2 \right] \tag{17}$$

Equation (17) has a non-central chi-square distribution with 2L degrees of freedom and a probability distribution function (PDF) of:

$$P_F(\lambda) = \frac{1}{2\sigma_1^2} \left( \frac{\lambda}{\alpha^2} \right)^{\frac{L-1}{2}} e^{-\frac{\alpha^2 + \lambda}{2\sigma_1^2}} I_{L-1}\left( \sqrt{\lambda} \frac{\alpha}{\sigma_1^2} \right), \lambda \geq 0$$

where $$\alpha^2 = \sum_{k=1}^{L} \left[ (S_k^I)^2 + (S_k^Q)^2 \right] \tag{19}$$

$$= A^2 \sum_{k=1}^{L} \rho^2(\Delta f)$$

$$= A^2 L \rho^2(\Delta f).$$

The chi-square distribution function of F is given by Equation (20) where $I_k(x)$ is the kth-order modified Bessel function of the first kind, and Q(u,v) is the Markum-Q function of Equation (21). Variables u and v in Equation (20) are given by Equation (22).

$$F_F(r) = \int_0^r P_F(\lambda) d\lambda \tag{20}$$

$$= 1 - Q(u, v) - e^{-\frac{u^2 + v^2}{2}} \sum_{k=1}^{L-1} \left( \frac{v}{u} \right)^k I_k(uv)$$

where $$Q(u, v) = \int_v^\infty x e^{-\frac{u^2 + x^2}{2}} I_0(ux) dx, \tag{21}$$

and where u and v are the scaled amplitude and normalized thresholds, respectively:

$$u = \frac{\alpha}{\sigma_1} = \frac{\sqrt{LA^2}\, \rho(\Delta f)}{\sqrt{M\sigma^2}} = \sqrt{\frac{2L(E_s/N_o)}{M}}\, \rho(\Delta f) \tag{22}$$

$$= \sqrt{\frac{2L^2(E_s/N_o)}{N}}\, \rho(\Delta f)$$

$$v = \frac{\sqrt{r}}{\sigma_1} = \sqrt{\frac{Lr}{N\sigma^2}}; \tag{23}$$

and where $E_s = \frac{1}{2}A^2T$ signifies the signal energy in the duration of T and $E_s/N_0$ is the signal-to-noise ratio in the same duration.

In Equation (22), u represents a scaled amplitude and in Equation (23), v represents a normalized threshold of the signal.

When there is only noise in the DFT correlator, u=0, a=0, and A=0, and the chi-square distribution function becomes $$(F_F(r))|_{u=0} = \begin{cases} 1 - e^{-\frac{v^2}{2}}, & L = 1 \\ 1 - e^{-\frac{v^2}{2}} \left( 1 + \sum_{K=1}^{L-1} \frac{(v^2/2)^k}{k!} \right), & L > 1 \end{cases} \tag{24}$$

Probability of Missed Detection

Equation (20) represents the probability of a detection which is 1 minus the probability of a missed detection and can be easily be derived by the skilled artisan.

Equation (24) can be derived from Equation (20) for the special case of u=0.

Probability of False Detection

The probability of false alarm, $P_{fa}(v)$ can be derived from $F_F(r)|_{u=0}$, Equation (24), the probability of a detection when there are no detections in the Burst. That is, if there is no signal a detection must be a false detection.

Thus, Equation (25) is the probability of a false detection.

$$(P_{fa}(v) = 1 - F_F(r)|_{u=0} \tag{25}$$

$$= \begin{cases} e^{-\frac{v^2}{2}}, & L = 1 \\ 1 - e^{-\frac{v^2}{2}} \left( 1 + \sum_{K=1}^{L-1} \frac{(v^2/2)^k}{k!} \right), & L > 1 \end{cases}$$

Comparison Table

Next, Table 1 illustrates how a performance comparison for different L's is made after computing the probabilities of false and miss detection given a specific number of samples N for both a best case and worst case scenario.

The comparisons are made at the thresholds, v, where $P_{fa}$ is equal to $P_{miss}$ because the crossing points 310, 320, 410 and 420 always give the best performance at the same time. It may not be desirable to sacrifice overall performance by having more false detections than missed detections or more missed detections than false detections.

A best case is defined as a case where Δf=0, corresponding to where the incoming frequency is a bin frequency. A worst case is defined where Δf=1/(2NT) corresponding to a case where the incoming frequency is in the middle between two consecutive bin frequencies, i.e., at adjacent edges of bin frequency bands. The case of L=1 corresponds to the convention DFT scheme which is used for the performance comparison.

A set minimum operating signal to noise ratio, SNR, or $E_s/N_o$, is selected and used as a baseline for performance comparisons. For example, in a satellite system one minimum operating SNR could be −2.5 dB. Since the system designer needs to ensure satisfactory detection performance at a minimum specified SNR, all comparisons are done at this baseline.

Best Case

Figure 3:
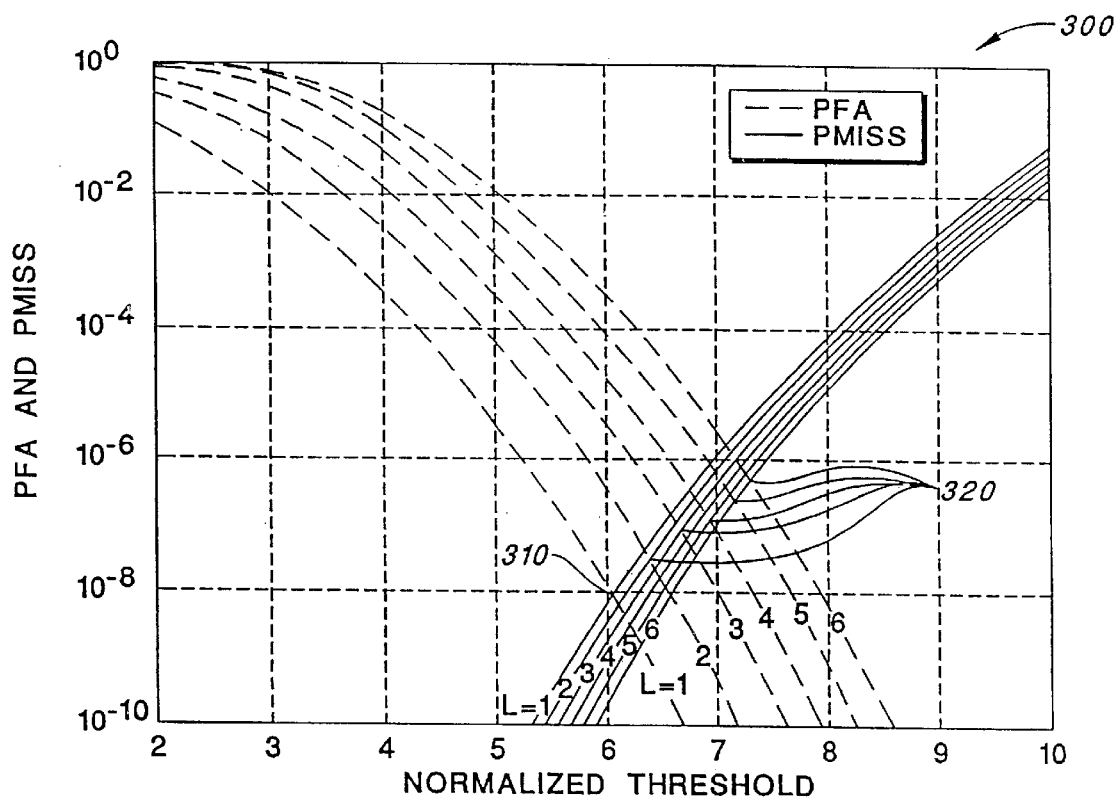
FIG. 3 is a diagram of the theoretical and simulated false detection and miss detection probabilities for the best case, where $\Delta fT=0$ is the case in which there is no frequency offset from the bin frequency; $N=120$; and $E_s/N_o=-2.5$ dB.

Turning to FIG. 3, a best case plot 300 of the probabilities of false detection and miss detection for the best case assumes a minimum SNR of −2.5 dB and 120 data samples in the burst. $P_{fa}$ and $P_{miss}$ are plotted against a normalized threshold v, representing operating threshold for each of L=1 through 6. The best operating threshold for each L corresponds to the point $P_{fa}=P_{miss}$ corresponding to the crossing points 310, 410, 320 and 420 of the two respective sets of curves on FIG. 3 representing missed detections and false detections. This is because it is optimal to have an equal number of false detections as missed detections and to have the minimum false and minimum missed at the same time. Also, the lower the crossing points 310, 410, 320 and 420 are on the graph, the better the overall detection performance since both $P_{fa}=P_{miss}$ have lower values, on the probability axis, for the same normalized threshold.

The crossing points 310, 320 of the $P_{fa}$ and $P_{miss}$ curves for FIG. 3 are summarized in Table 1 below for ease of interpretation.

Figure 4:
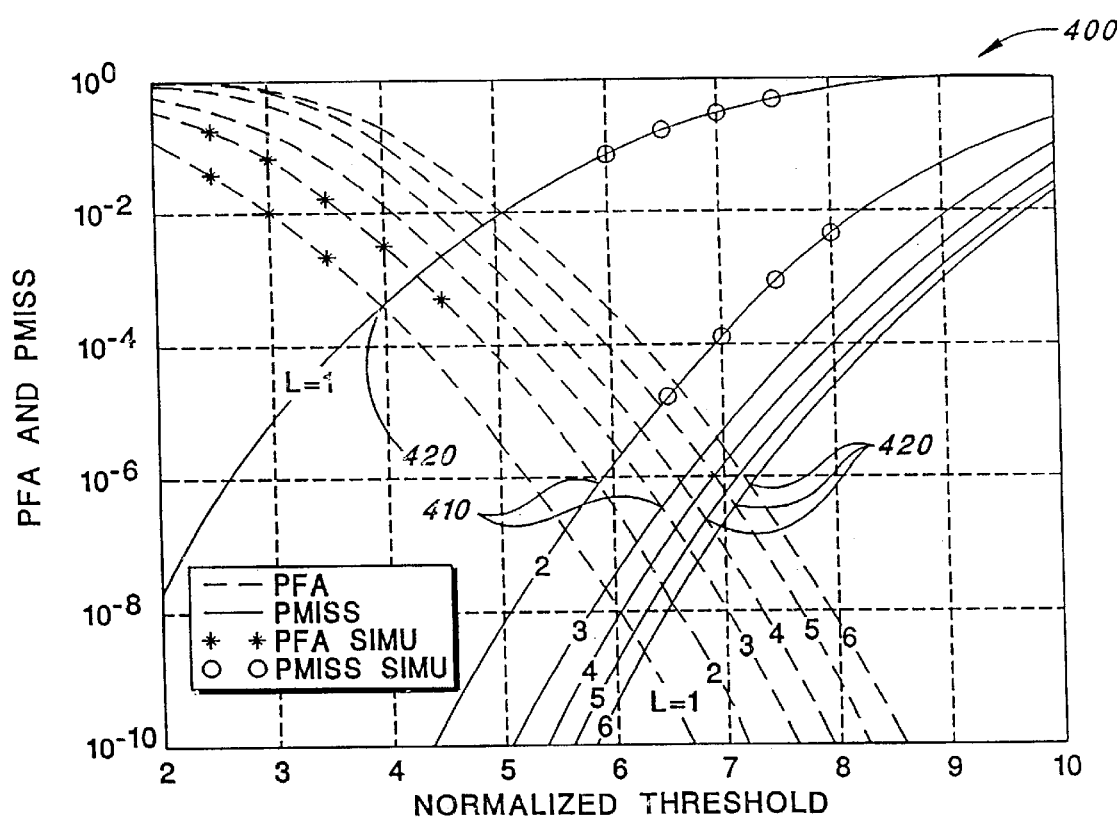
FIG. 4 is a diagram of false detection and miss detection probability data for the worst case, where $\Delta fT=1/(2N)$; $N=120$; and $E_s/N_o=-2.5$ dB.

In FIG. 4 a similar worst case plot 400 for the worst case is shown. The best operating threshold for each L is also chosen where the false detection and missed detection probabilities are equal. The crossing points 420, 410 in FIG. 4 are also summarized in Table 1 for ease of comparison.

From Table 1 it is shown that the best case crossing point 310 for L=1 (conventional) in the best case is the lowest at $P_{fa}=P_{miss}=10^{-8}$. As L increases, the point of $P_{fa}=P_{miss}$ is increased to $4 \times 10^{-7}$ or L=6 for the ideal case.

This makes sense because the incoming frequency is exactly the bin frequency and there is no advantage to sub-dividing the burst. However, for the worst case, a performance of the conventional scheme at the crossover $P_{fa}=P_{miss}$ is $3 \times 10^{-4}$ which is much worse than the performance of L=2 through 6.

For this particular case of the worst case, L=3 which corresponds to $P_{fa}=P_{miss}=2.9 \times 10^{-7}$, L=3 offers the lowest crossing point 410 compared to other crossing points 420.

If considering both the best and the worst case, L=2 may be chosen in a particular embodiment of this system, for an overall best performance since the case of L=2 also yields the simplest implementation since the number of squares is minimum other than for the conventional scheme.

In FIG. 3 curves L=1 and L=2 are developed using simulated probability data and curves L=3 through L=6 are developed through theoretical data. The theoretical data is confirmed by the simulation as shown in FIG. 4.

Table 1 below shows the crossing points of $P_{fa}$ and $P_{miss}$ for each different L=1 through 6 when samples N=120 and $E_s/N_o = -2.5$ dB; $\Delta ft = 1/(2N)$.

TABLE 1

| L | Best Case $P_{fa} = P_{miss}$ | Worst Case $P_{fa} = P_{miss}$ |
|---|---|---|
| 1 | $1.0 \times 10^{-8}$ | $3.0 \times 10^{-4}$ |
| 2 | $3.0 \times 10^{-8}$ | $7.0 \times 10^{-7}$ |
| 3 | $7.0 \times 10^{-8}$ | $2.9 \times 10^{-7}$ |
| 4 | $1.3 \times 10^{-7}$ | $3.0 \times 10^{-7}$ |
| 5 | $2.4 \times 10^{-7}$ | $4.2 \times 10^{-7}$ |
| 6 | $4.0 \times 10^{-7}$ | $5.5 \times 10^{-7}$ |

By using this method, the probability equations for missed and false detection, Equations (20) and (25), can be used to find the optimal L and its corresponding optimal performance for a particular application in satellite communications, remote sensing, remote frequency calibration and other similar fields.

Figure 5:
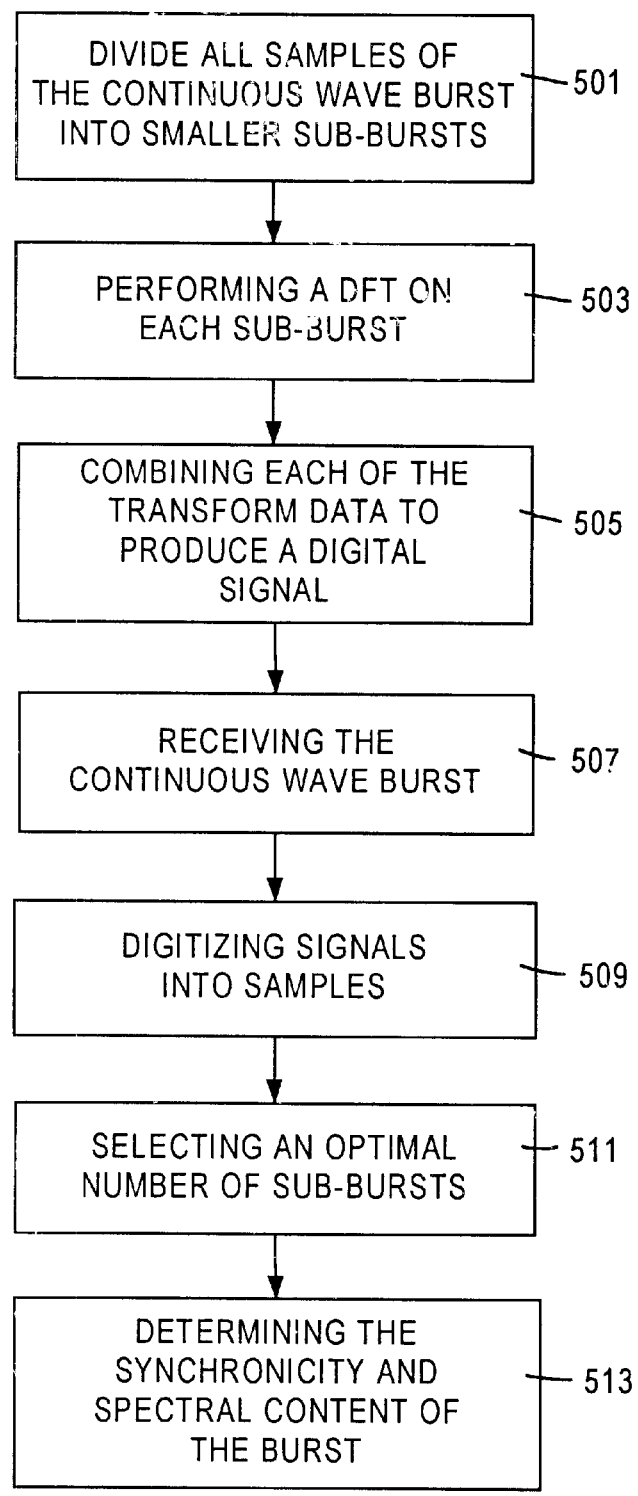
FIG. 5 is a flow chart illustrating a method of improving the spectral sampling in a communication system using a Discrete Fourier Transform processor.

FIG. 5 is a flow chart illustrating a method of improving the spectral sampling in a communication system using a Discrete Fourier Transform processor. The method detects a continuous wave burst with large initial spectral uncertainties.

Improving the spectral sampling in a communication system using a Discrete Fourier Transform processor to detect a continuous wave burst comprises a method with various steps. The samples of the continuous wave burst are divided into smaller sub-bursts, as shown in step 501. In step 503, a Discrete Fourier Transform having a finite number of frequency bins, each representing a different band-pass filter, is performed on each sub-burst. The Transform produces associated Transform data for each of the smaller sub-bursts.

Each of the associated Transform data is combined to produce a digital signal, as shown in step 505. In step 507, the continuous wave burst comprising the digital signal is received, and is digitized in step 509 into a number of digital samples. In step 511, an optimal number of sub-bursts is selected based on the system performance including the digital samples, data rates, estimated spectral and time uncertainty of the burst and desired detection performance at a minimum operating signal-to-noise ratio. The synchronicity and the spectral content of the burst based on the optimal number of sub-bursts is determined, as shown in step 513.

While the invention herein disclosed has been described by means of specific embodiments and application thereof, numerous modifications could be made by skilled artisans without deserting from the scope of the invention set forth in the claims.

What is claimed is:

1. A method for improving spectral sampling in a communication system using a Discrete Fourier Transform processor to detect a continuous wave burst with large initial spectral uncertainties, the method comprising the steps of:

dividing all samples of the continuous wave burst into smaller sub-burst, each having a smaller number M of samples than the burst number N of samples, wherein M and N are positive integers;

performing a Discrete Fourier Transform on each sub-burst, the Transform having a finite number of frequency bins, each representing a different band-pass filter, the Transform producing associated Transform data for each of the smaller sub-bursts;

non-coherently combining each of the associated Transform data to produce a digital signal;

receiving the continuous wave burst, the burst comprising the digital signal;

digitizing the digital signal into N digital samples;

selecting an optimal number L of sub-bursts based upon system performance including the N digital samples, data rates, estimated spectral and time uncertainty of the burst and desired detection performance at a minimum operating signal-to-noise ratio, wherein L is a positive integer and L is less than N; and determining the synchronicity and the spectral content of the burst based upon the optimal number L of sub-bursts.

2. The method of claim 1 wherein the step of selecting an optimal number of sub-bursts further comprises the steps of:

selecting a maximum experimental number of sub-bursts, not smaller than the optimal number L;

determining a false detection probability function at each of the candidate numbers not greater than the maximum experimental number;

determining a missed detection probability function at each of the candidate numbers;

simulating said false detection and said missed detection probability data for each of the candidate numbers for each of a best case and a worst case, according to the probability functions, wherein he best case corresponds to a detection at the center of a frequency bin and the worst case corresponds to a detection in the middle of two frequency bins; and comparing the false detection and missed detection probability data to determine an optimal number L of sub-bursts.

3. The method of claim 2 wherein the maximum experimental number of sub-bursts is 6.

4. The method of claim 2 wherein the step of comparing the probability data further comprises comparing the data at a plurality of corresponding crossing points 410, 420 of the missed detection data and false detection data for the worst case for each candidate number of sub-bursts.

5. The method of claim 2 wherein the step of comparing further comprises comparing the data at a plurality of corresponding crossing points 310, 320 of the missed detection data and the false detection for the best case for each candidate number of sub-bursts.

6. The method of claim 2 wherein the step of comparing further comprises comparing the data at a plurality of corresponding crossing points 310, 320, 410 and 420 of the missed detection and false detection data for the best and worst case for each candidate number of sub-bursts.

7. The method of claim 2 wherein the false detection probability function is $$(P_{fa}(v) = 1 - F_F(r)|)_{u=0} \tag{25}$$

-continued $$= \begin{cases} e^{-\frac{v^2}{2}}, & L=1 \\ 1 - e^{-\frac{v^2}{2}}\left(1 + \sum_{K=1}^{L-1} \frac{(v^2/2)^k}{k!}\right), & L>1 \end{cases}$$

and the miss detection probability function is $$F_F(r) = \int_0^r P_F(\lambda)d\lambda \tag{20}$$

$$= 1 - Q(u, v) - e^{-\frac{u^2+v^2}{2}} \sum_{k=1}^{L-1} \left(\frac{v}{u}\right)^k I_k(uv).$$

\* \* \* \* \*

UNITED STATES PATENT AND TRADEMARK OFFICE
CERTIFICATE OF CORRECTION

PATENT NO.     : 6,349,120 B1  
DATED          : February 19, 2002  
INVENTOR(S)    : Zhen-Liang Shi It is certified that error appears in the above-identified patent and that said Letters Patent is hereby corrected as shown below:

<u>Title page,</u>
Item [56], under OTHER PUBLICATIONS the inventors name should read
-- Zhen-Liang, Shi et al. --

Signed and Sealed this

Fourth Day of June, 2002

*Attest:*

JAMES E. ROGAN
*Attesting Officer*     *Director of the United States Patent and Trademark Office*